United States Patent
Yu et al.

(10) Patent No.: US 9,369,189 B2
(45) Date of Patent: Jun. 14, 2016

(54) METHOD AND APPARATUS FOR MEASURING AND FEEDING BACK CHANNEL INFORMATION IN COMMUNICATION SYSTEM USING BEAM FORMING

(71) Applicant: Samsung Electronics Co., Ltd., Suwon-si, Gyeonggi-do (KR)

(72) Inventors: Hyun-Kyu Yu, Suwon-si (KR); Jae-Weon Cho, Seongnam-si (KR); Tae-Young Kim, Seongnam-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/268,673

(22) Filed: May 2, 2014

(65) Prior Publication Data

US 2014/0328266 A1    Nov. 6, 2014

(30) Foreign Application Priority Data

May 3, 2013    (KR) .......................... 10-2013-0049893

(51) Int. Cl.
| | | |
|---|---|---|
| H04B 7/04 | (2006.01) | |
| H04B 7/08 | (2006.01) | |
| H04B 7/06 | (2006.01) | |
| H04L 5/00 | (2006.01) | |

(52) U.S. Cl.
CPC ............ *H04B 7/0408* (2013.01); *H04B 7/0417* (2013.01); *H04B 7/0617* (2013.01); *H04B 7/0619* (2013.01); *H04B 7/0897* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2006/0063492 A1 | 3/2006 | Iacono et al. | |
| 2006/0104382 A1 | 5/2006 | Yang et al. | |
| 2009/0238156 A1 | 9/2009 | Yong et al. | |
| 2010/0189091 A1* | 7/2010 | Poon ................. | H04B 7/0408 370/338 |
| 2012/0032848 A1* | 2/2012 | Nsenga .............. | H04B 7/0413 342/373 |
| 2013/0039345 A1 | 2/2013 | Kim et al. | |
| 2013/0039445 A1 | 2/2013 | Hwang | |
| 2013/0045690 A1* | 2/2013 | Seol .................... | H04B 7/0417 455/63.4 |
| 2014/0376464 A1* | 12/2014 | Nam .................... | H04B 7/0639 370/329 |
| 2016/0021551 A1* | 1/2016 | Park .................... | H04B 7/0619 370/328 |

FOREIGN PATENT DOCUMENTS

| | | |
|---|---|---|
| KR | 10-2006-0037194 A | 5/2006 |
| KR | 10-2011-0045649 A | 4/2011 |
| KR | 10-2011-0134860 A | 12/2011 |

* cited by examiner

Primary Examiner — Ashley Shivers
(74) Attorney, Agent, or Firm — Jefferson IP Law, LLP

(57) ABSTRACT

A method of feeding back channel information by a receiver in a communication system beam forming is provided. The method includes determining an optimum reception beam using intensities of reference signals received through transmission beams of a base station for a first period through a first path for mapping analog beams of an input signal, and determining an optimum transmission beam of the transmission beams using intensities of reference signals received through the optimum reception beam for a second period through a second path for mapping analog beams of the input signal, and transmitting channel information measured by using a reference signal received through the optimum transmission beam and the optical reception beam to a transmitter.

22 Claims, 5 Drawing Sheets

METHOD AND APPARATUS FOR MEASURING AND FEEDING BACK CHANNEL INFORMATION IN COMMUNICATION SYSTEM USING BEAM FORMING

CROSS-REFERENCE TO RELATED APPLICATION(S)

This application claims the benefit under 35 U.S.C. §119(a) of a Korean patent application filed on May 3, 2013 in the Korean Intellectual Property Office and assigned Serial number 10-2013-0049893, the entire disclosure of which is hereby incorporated by reference.

TECHNICAL FIELD

The present disclosure relates to a method and an apparatus for measuring and feeding back channel information of a receiver in a communication system using beam forming.

BACKGROUND

In order to meet traffic demands of wireless data which has continuously increased, the wireless communication system has been developed for supporting a higher data transmission rate. Currently commercialized 4-th Generation (4G) systems are being developed mainly to improve spectral efficiency in order to increase a data transmission rate. However, it is difficult to satisfy increasing wireless data traffic demands only with improving frequency efficiency.

The use of a very wide frequency band has been considered. However, because a current mobile communication cellular system uses a frequency band of no more than 10 GHz, it is difficult to secure a wide frequency band. Accordingly, it is required to secure a broadband frequency in a higher frequency band. However, as a frequency for wireless communications increases, a wave path loss also increases. Accordingly, the wave propagation distance becomes shorter and the service coverage area decreases. In order to solve the problem, a beam forming technology has been suggested as an important technology for alleviating wave path loss and increasing a transfer distance of waves.

The beam forming technology may be classified into transmission beam forming performed at a transmission end and reception beam forming performed at a reception end. In general, the Tx beam forming increases directivity by concentrating a radio wave arrival area at a particular direction by using a plurality of antennas. Then, the form in which a plurality of antennas are provided may use an antenna array, and the antennas included in the antenna array may be referred to as array elements. The antenna array may be configured in various types such as a linear array and a planar array. If the transmission beam forming is used, transmission distance increases as a directionality of signals increases. Further, since the signal that is transmitted in another direction is reduced, signal interference for another receiving end significantly decreases.

Likewise, the transmission end also may perform beam forming on a received signal using a reception antenna array. The Rx beam forming concentrates reception of radio waves from a particular direction to increase received signal sensitivity incident from that corresponding direction and excludes signals incident from other directions to provide a gain of blocking an interference signal.

As described above, in order to secure a wide frequency band, an ultra-high frequency, that is, a millimeter wave system is expected to be introduced, in which case a beam forming technology for overcoming wave path loss is being considered. In a communication system to which a beam forming technology is applied, a transmitter selects an optimum transmission/reception beam and measures and feeds back channel information on the transmission/reception beam. Thus, measures for improving an operation of the transmitter in a communication system to which the beam forming technology is applied are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for measuring and feeding back channel information of a receiver in a communication system using beam forming.

In accordance with an aspect of the present disclosure, a method of feeding back channel information by a receiver in a communication system using beam forming is provided. The method includes determining an optimum reception beam using intensities of reference signals received through transmission beams of a base station for a first period through a first path for mapping analog beams of an input signal, and determining an optimum transmission beam among the transmission beams using intensities of reference signals received through the optimum reception beam for a second period through a second path for mapping analog beams for the input signal, and transmitting channel information measured by using a reference signal received through the optimum transmission beam and the optical reception beam to a transmitter.

In accordance with another aspect of the present disclosure, a receiver for transmitting channel information in a communication system using beam forming is provided. The receiver includes a controller that determines an optimum reception beam using intensities of reference signals received through reception beams of a base station for a first period through a first path for mapping for analog beams of an input signal, and determines an optimum transmission beam of the transmission beams using the intensities of the reference signals received through the optimum reception beam for a second period through a second path of the paths, and a transceiver that transmits channel information measured by using a reference signal received through the optimum transmission beam and the optimum reception beam according to an instruction of the controller to the transmitter.

In accordance with another aspect of the present disclosure, an apparatus of receiving channel information in a communication system using beam forming is provided. The apparatus includes a controller that controls a transceiver such that a request for a feedback of channel information of a receiver is transmitted, and the transceiver that receives the channel information in a period set based on the number of paths for mapping for analog beams of an input signal of the receiver.

According to the present disclosure, in a communication system using beam forming, a receiver adaptively manages two or more paths provided for mapping analog beams of an input signal to determine an optimum transmission/reception beam and determines channel information, thereby more efficiently performing a feedback operation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
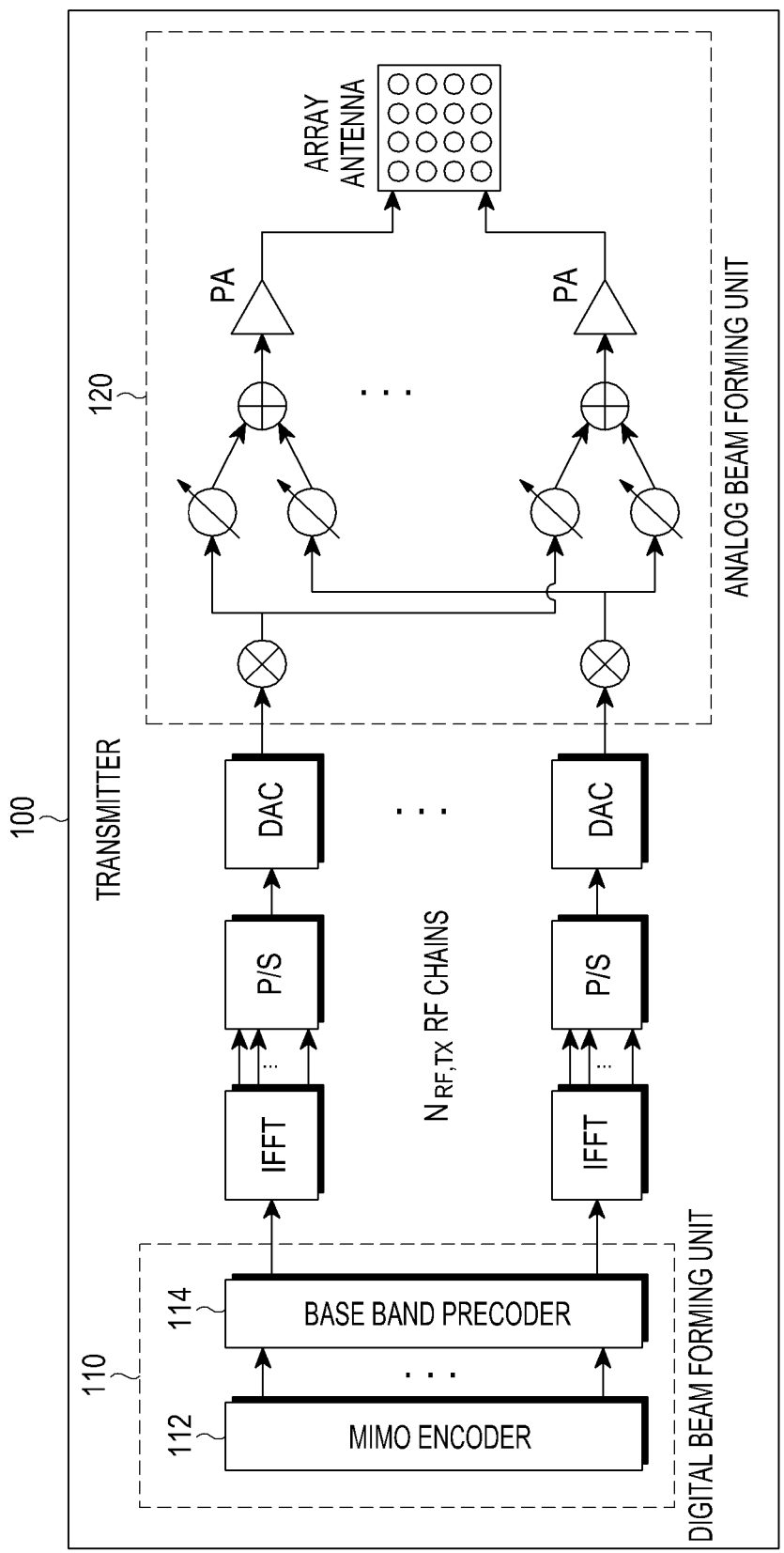
FIG. 1 is a schematic diagram of a beam forming transmitter according to an embodiment of the present disclosure.

FIG. 1 is a schematic diagram of a beam forming transmitter according to an embodiment of the present disclosure.

Referring to FIG. 1, a transmitter 100 includes a digital beam forming unit 110 and an analog beam forming unit 120, and it is assumed as an example that the analog beam forming unit 120 includes one array antenna. The one array antenna includes $N_{TX} \times N_{TX}$ element antennas.

The digital beam forming unit 110 and the analog beam forming unit 120 are connected to paths corresponding to each $N_{TX}$ element antenna to map data input to the transmitter 100 for analog beams. The paths are also generally called digital chains and analog chains. Hereinafter, in the specification, the paths are also referred to as Radio Frequency (RF) chains.

The digital beam forming unit 110 includes, for example, a Multiple Input Multiple Output (MIMO) encoder 112 and a base band precoder 114. The RF chains corresponding to the $N_{TX}$ element antennas include, for example, an Inverse Fast Fourier Transform (IFFT) block and a Parallel/Series (P/S) transformer, and a Digital Analog Converter (DAC). The analog beam forming unit 120 includes, for example, mixers and Power Amplifiers (PAs) that are connected to the $N_{TX}$ element antennas. If signals pass through the RF chains and are input to the analog beam forming unit 120, the signals are multiplied by weights for the corresponding element antennas through phase shifters that are connected to each of the RF chains, are added to signals of the chains, and then are transmitted through the corresponding element antennas via the PAs. Referring to FIG. 1, the number of RF chains is denoted by $N_{RF,TX}$. FIG. 1 shows only elements of a transmitter for supporting beam forming, and exemplifies one array antenna as an example. However, the transmitter according to an embodiment of the present disclosure may be applied to a structure in which a plurality of array antennas are present.

Hereinafter, as shown in FIG. 1, the present disclosure provides a method and an apparatus in which a receiver, having received a channel measurement reference signal from a transmitter to which beam forming is applied, measures channel information based on the channel measurement reference signal and feeds back the measured channel information to a transmitter. Then, the channel information considered in the embodiment of the present disclosure may be largely classified into two types. One of the channel information is optimum transmission/reception beam index information that is selected by a terminal, and the other thereof is Channel State Information (CSI). CSI is information measured for specific transmission/reception beams and includes a Channel Quality Indicator (CQI), Preferred Matrix Index (PMI), and a Rank Indicator (RI).

A minimum reportable period for a CSI report may be set according to the number of RF chains of a receiver using beam forming. In this case, the minimum reportable period is changed according to the number of RF chains and the receiver should report the changed minimum reportable period to the transmitter. When the transmitter requests a report of channel information from the receiver, it is assumed that the receiver variably sets the number (M) of reportable optimum beams. Then, the receiver sets a minimum reportable period corresponding to the number of the variably set optimum beams and forwards the set minimum reportable period to a base station. According to another embodiment of the present disclosure, the receiver may report only information on the number of RF chains of the receiver to the transmitter and, in response, the transmitter may calculate the number of reported RF chains and the minimum reportable period of the receiver using Equation 1.

When $L-M<1$, $T_{report} \geq 2 \times T_{RS}$

When $L-M+1$, $T_{report} \geq T_{RS}$     Equation 1

Here, L denotes the number of RF chains of the receiver and M denotes an optimum number of beams reported to the transmitter by the receiver. $T_{report}$ denotes a CSI information report period in which the receiver reports CSI information to the transmitter and $T_{RS}$ denotes a period of a channel measurement reference signal transmitted by the transmitter.

The process of calculating and forwarding a minimum reportable period for a CSI report of the receiver may be performed in a capability negotiation of the transmitter and the receiver or may be performed before or after a capability negotiation time point according to an initial time point of the CSI report.

Thereafter, if the process of calculating and forwarding a minimum reportable period for a CSI report by the receiver is completed, the receiver classifies RF chains of the receiver to measure channel information, generates feedback information based on the measured channel information, and forwards the feedback information to the transmitter. Hereinafter, it is assumed that the receiver includes two or more RF chains.

Figure 2:
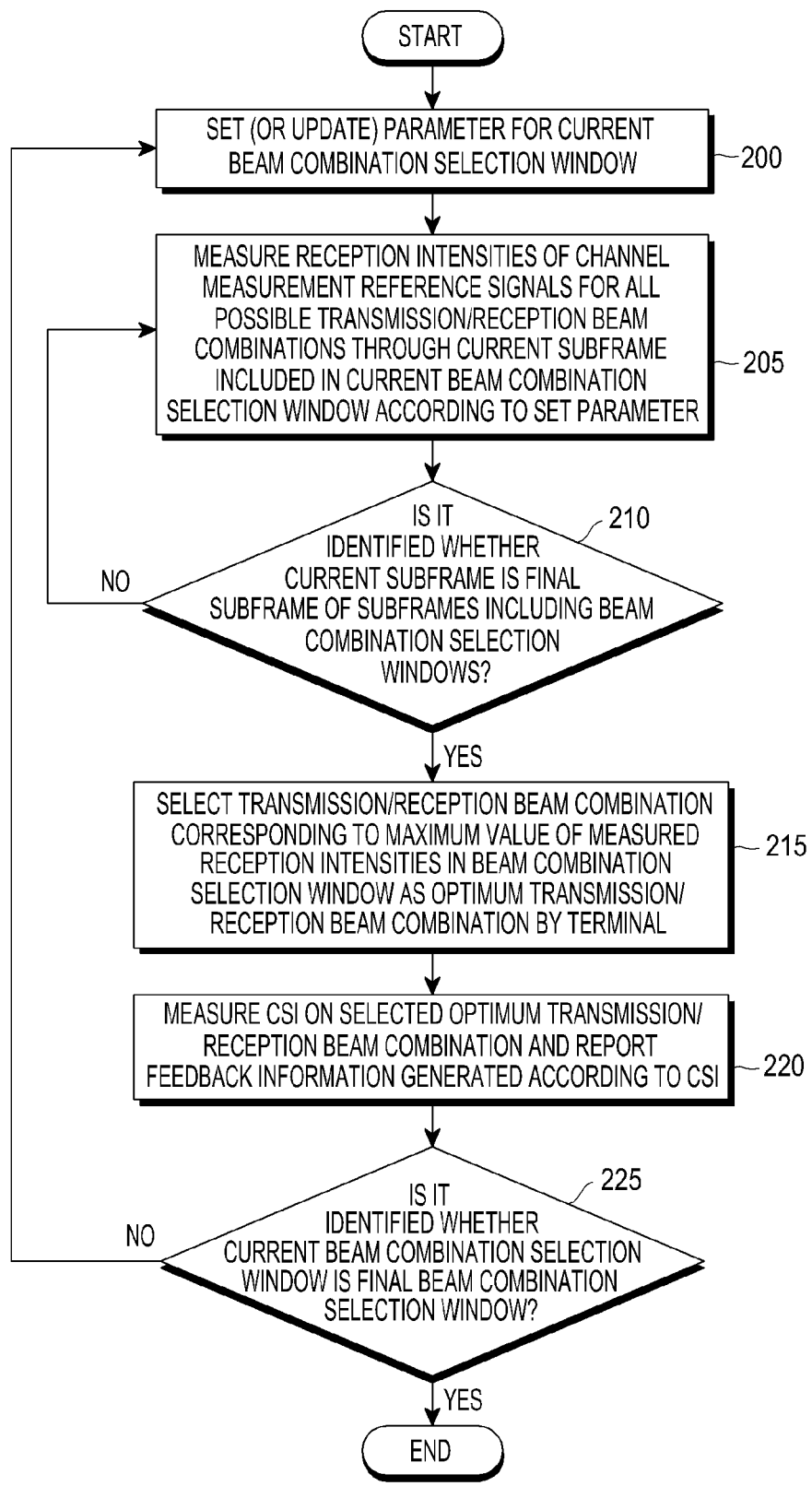
FIG. 2 is a flowchart of an operation of measuring channel information by a receiver according to an embodiment of the present disclosure.

FIG. 2 is a flowchart of an operation of measuring channel information by a receiver according to an embodiment of the present disclosure.

Referring to FIG. 2, in operation 200, the receiver sets parameters for a section (hereinafter, referred to as 'a beam combination selection window') for selecting an optimum transmission/reception beam combination. The parameters include the size of a beam combination selection window, a movement period (a resetting period of the beam combination selection window), and a separation between windows. The parameters are determined according to a period and an algorithm for selection of a beam combination.

In operation 205, the receiver receives channel measurement reference signals for all transmission beams of the transmitter for each reception beams of the receiver through a current subframe included in the current beam combination selection window set to correspond to the parameters. A detailed embodiment of the beam combination selection window set to correspond to the parameters will be described in detail below with reference to FIGS. 3 and 4.

In operation 210, the receiver identifies whether the current subframe is a final subframe of in the beam combination selection window. When the current subframe is not a final subframe, the receiver returns to operation 205 and receives channel measurement reference signals for all transmission beams of the transmitter for each reception beams of the receiver through the following subframe of the current frame and measures a reception intensity of the received signal.

When the current subframe is a final subframe, the receiver selects a transmission/reception beam combination having a maximum value in the beam combination selection window as a transmission/reception beam combination in operation 215. In operation 220, the receiver measures CSI for the selected transmission/reception beam combination and reports feedback information generated based on the measured CSI to the transmitter. In the embodiment of the present disclosure, when the receiver includes a plurality of RF chains, an RF chain used to select an optimum transmission/reception beam combination and an RF chain for measuring CSI of the selected optimum transmission/reception beam combination may be managed separately. Accordingly, the receiver variably allocates purposes to the RF chains in consideration of a period for selection of an optimum transmission/reception beam combination and a CSI report period. A detailed embodiment thereof will be described in detail with reference to FIGS. 3 and 4.

In operation 225, it is identified whether the current beam combination selection window is a final beam combination selection window of the preset beam combination selection windows. When the current beam combination selection window is not a final beam combination selection window, the receiver returns to operation 200 and repeats measurement of CSI in the following beam combination selection window.

When the current beam combination selection window is a final beam combination selection window after the identification, the receiver completes measurement of CSI.

Figure 3:
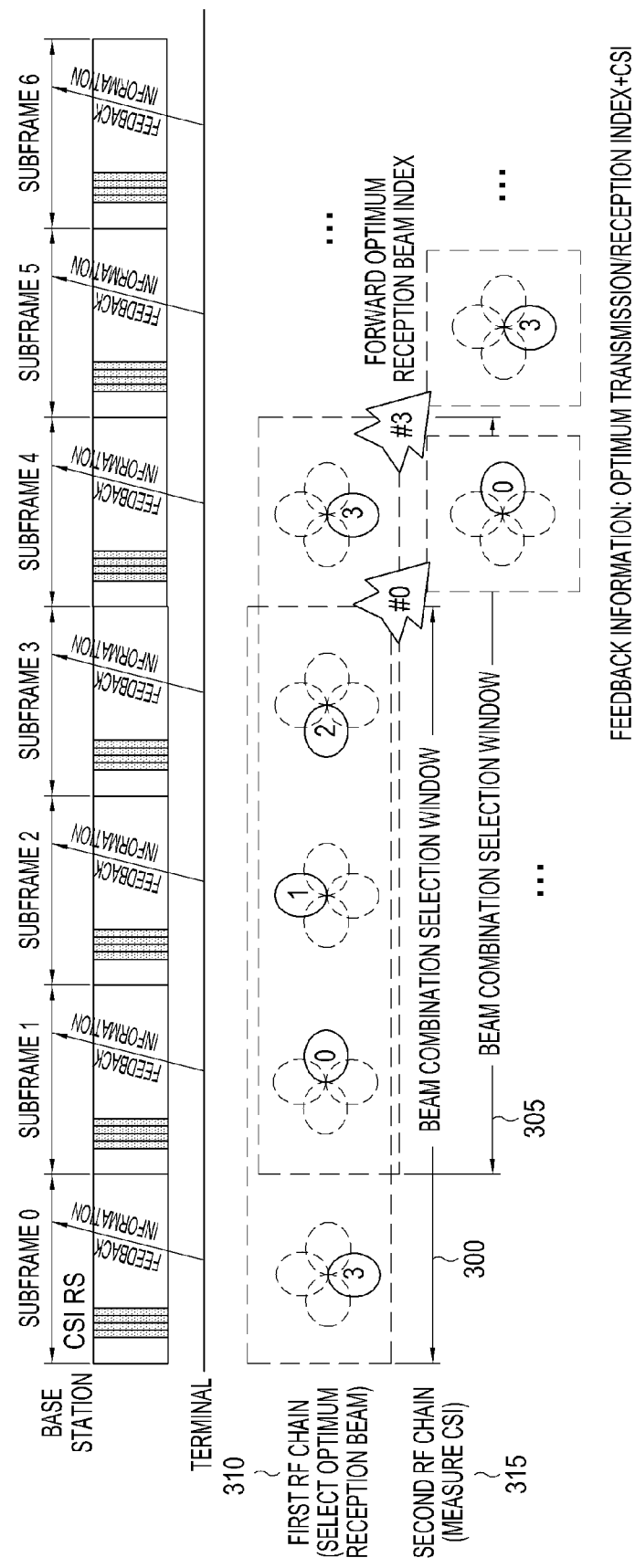
FIG. 3 is a view for explaining an operation of measuring channel information in consideration of a plurality of Radio Frequency (RF) chains of a receiver according to a first embodiment of the present disclosure.

FIG. 3 is a view for explaining an operation of measuring channel information in consideration of a plurality of RF chains of a receiver according to a first embodiment of the present disclosure.

Referring to FIG. 3, it is assumed that, in the first embodiment of the present disclosure, a CSI reference signal is used as an example of a channel measurement reference signal of the receiver. It is assumed that a CSI reference signal transmission period, a CSI report period of the receiver, and an optimum transmission/reception beam index report period are the same, i.e., correspond to one subframe. In the embodiment of FIG. 3, the transmitter transmits a CSI Reference Signal (RS) through all transmission beams in one subframe and the receiver measures an optimum reception beam and CSI information using CSI RSs for the received transmission beams. Then, it is assumed that, as an example, the receiver includes two RF chains 310 and 315. In this case, the receiver uses the first RF chain 310 to select an optimum reception beam index and selects the second RF chain 315 as an optimum transmission beam for the selected reception beam and uses the second RF chain 315 to measure a CSI.

For sake of convenience, it is assumed that the total number of reception beams of the receiver is 4. In addition, it is assumed that the size of the beam combination selection window is set to four subframes corresponding to the total number of reception beams and the beam combination selection window is reset for each subframe. That is, because a separation between the beam combination selection windows is set to one subframe, an optimum transmission/reception beam index report period of the receiver may be set to one subframe.

Referring to FIG. 3, in beam combination selection window 1 300, which includes subframes 0 to 3, the receiver finds an optimum reception beam using the first RF chain 310. In detail, the receiver fixes one of the reception beams of the receiver for each subframe and receives a CSI RS transmitted for all transmission beams through the corresponding subframe. Reception beam #0 is selected as an optimum reception beam as an example of a reception beam whose reception intensity is highest among the CSI RSs received through beam combination selection window 1 300. In subframe 4, which is the following subframe of the beam combination selection window 305, the receiver measures CSI for all reception beams for the optimum reception beam #0 through the second RF chain 315 and determines a transmission beam index having a maximum value of the measured CSI. Accordingly, in subframe 4, the receiver generates an optimum transmission/reception beam index and CSI as feedback information and reports the information to the transmitter.

Likewise, in beam combination selection window 2 305, the receiver selects reception beam #3 as an optimum reception beam using the first RF chain 310. Beam combination selection window 2 305 includes subframes 1 to 4. In subframe 5, which is the following subframe of the beam combination selection window 305, the receiver measures CSI for all reception beams for the optimum reception beam #3 through the second RF chain 315 and determines a transmission beam index having a maximum value of the measured CSI. Accordingly, the receiver measures an optimum transmission/reception beam index and CSI and reports feedback information including the optimum transmission/reception beam index and CSI information to the transmitter in subframe 5.

Based on the configuration of FIG. 3, the receiver according to another embodiment of the present disclosure may find an optimum transmission/reception beam combination through the first RF chain 310, measure CSI on an optimum transmission/reception beam combination selected through the second RF chain 315, and report the CSI as feedback information through the same frame.

As with the assumptions of FIG. 3, it is assumed that the total number of RF chains of the receiver according to another embodiment of the present disclosure is 3. In this case, the receiver may use the two RF chains in selecting an optimum reception beam. Then, the size of the beam combination selection window may be adjusted to two subframes by using the two RF chains in parallel. In this case, an optimum reception beam may be selected by using a CSI RS received at a time that is twice as fast as the first embodiment of the present disclosure. That is, as the number of RF chains which is usable for selection of an optimum beam increases, an optimum reception beam may be selected based on a recent CSI RS. In another embodiment, when the receiver includes four RF chains, the receiver may select an optimum transmission/reception beam combination using all four RF chains in one subframe and measure CSI information.

As with the assumptions of FIG. 3, it is assumed that the total number of RF chains of the receiver according to another embodiment of the present disclosure is 3. In this case, the receiver may use two RF chains in selection of an optimum transmission beam and measurement of CSI and may use one RF chain in measurement of an optimum reception beam. In this case, the size and resetting period of the beam combination selection window are the same as those of FIG. 3 and the receiver uses two RF chains so that an optimum transmission beam may be selected and CSI information may be measured for two optimum reception beams. In this case, in the beam combination selection window 1 300, the receiver selects two optimum reception beams in the highest order of CSI RSs using the first RF chain 310. Thereafter, in subframe 4, the receiver may select an optimum transmission beam for the two selected optimum reception beams using the second RF chain 310 and the third RF chain (not shown), and transmit feedback information to the transmitter in the same frame.

When the receiver includes a plurality of RF chains according to the first embodiment of the present disclosure, the receiver may variably allocate and manage purposes of the RF chains based on a preferred condition when an optimum reception beam is selected. The preferred condition may include whether an optimum reception beam is selected based on the CSI RS received most recently and on how many reception beams including an optimum transmission beam and CSI information will be reported.

Figure 4:
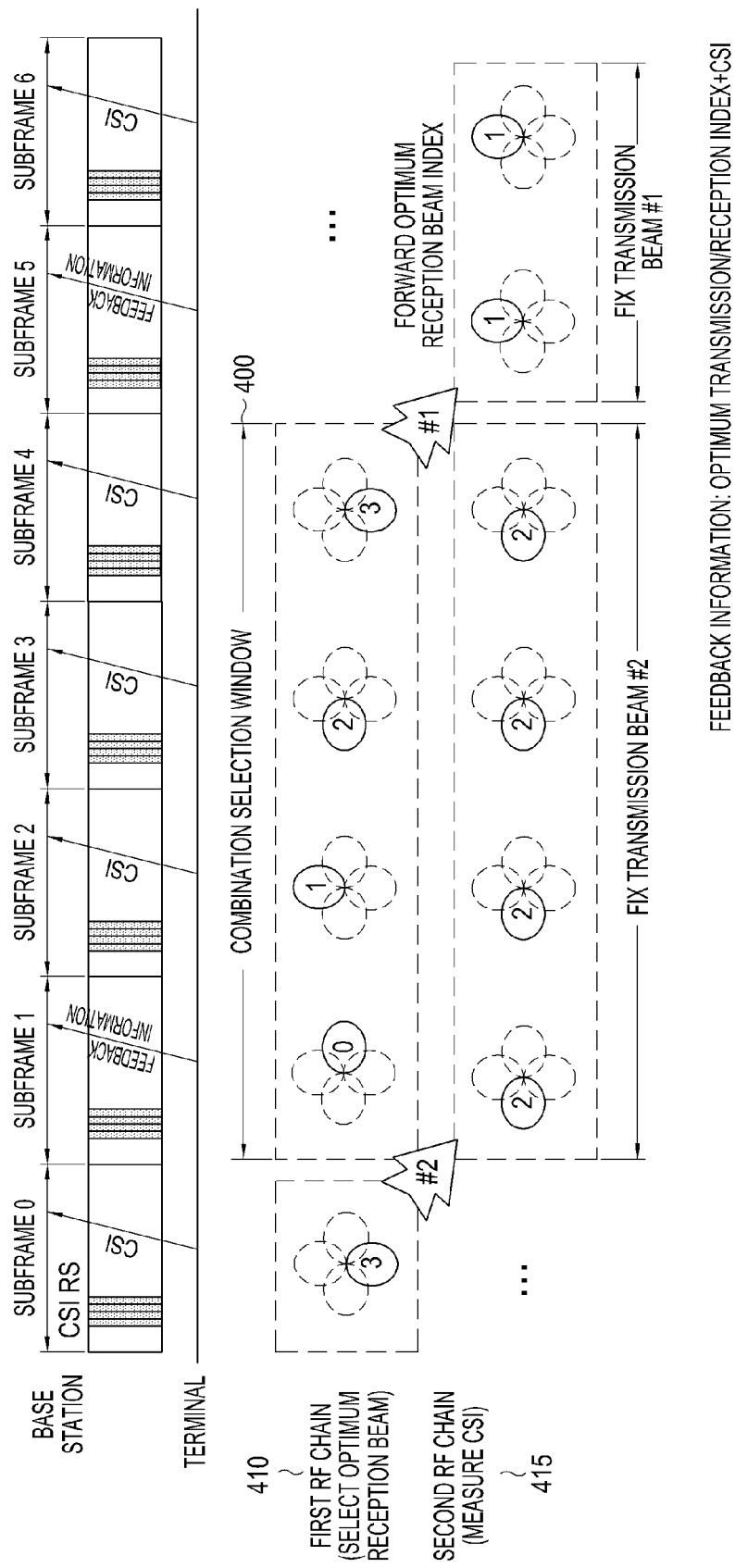
FIG. 4 is a view for explaining another example of an operation of, when a terminal includes a plurality of RF chains, measuring channel information according to a second embodiment of the present disclosure.

FIG. 4 is a view for explaining another example of an operation of, when the receiver includes a plurality of RF chains, measuring channel information according to a second embodiment of the present disclosure.

Referring to FIG. 4, it is assumed that, in the second embodiment of the present disclosure, a CSI RS transmission period of the transmitter and a CSI report period of the receiver are the same, but an optimum transmission/reception beam index report period of the receiver is relatively long. As in FIG. 3, the transmitter transmits CSI RS through all transmission beams in one frame and the receiver measures an optimum reception beam and CSI information using CSI RS for the received transmission beams. As in FIG. 3, with the assumption that the receiver includes a total of two RF chains, the receiver feeds back feedback information, which is measured by using the RF chains, to the transmitter. In detail, the first RF chain 410 is used to select an optimum reception beam index in a preset beam combination selection window 400. The second RF chain 415 is used to select an optimum transmission beam for the selected reception beam in the following sub-frame of the beam combination selection window 400 and measure CSI.

It is assumed that the receiver measures and reports an optimum transmission beam index for one reception beam and CSI information. As in FIG. 3, it is assumed that the total number of reception beams of the receiver is 4. Then, the size of the beam combination selection window is set to four subframes corresponding to the total number of reception beams. It is assumed that the beam combination selection window is reset for four subframes. Accordingly, an optimum transmission/reception beam index report period of the receiver is set to four subframes.

Referring to FIG. 4, in the beam combination selection window 400 including subframes 1 to 4, the receiver finds an optimum reception beam using the first RF chain 410. In detail, the receiver fixes one of the reception beams of the receiver for each subframe and receives a CSI RS transmitted for all transmission beams of the transmitter through the corresponding subframe. Reception beam #1 is selected as an optimum reception beam as an example of a reception beam whose reception intensity is highest among the CSI RSs received through beam combination selection window 1 400. In subframe 5 which is the following subframe of the beam combination selection window 400, the receiver measures CSI for all reception beams for the optimum reception beam #1 through the second RF chain 415 and determines a transmission beam index having a maximum value of the measured CSI. The receiver generates information on an optimum transmission/reception beam index and CSI as feedback information and reports the feedback information to the transmitter. Thereafter, in subframes 6, 7, and 8, the receiver measures CSI based on an optimum transmission beam selected in subframe 5 and reports the measured CSI to the transmitter. Then, in subframes 6, 7, and 8, when an index of an optimum reception beam having a maximum value of CSI measured based on the optimum transmission beam is replaced by an optimum reception beam index reported by subframe 5, the receiver may report an optimum reception beam index as the changed reception beam index and transmit the changed reception beam and CSI on the optimum transmission beam as feedback information. In this case, it is possible to use different reception beams in subframes 6, 7, and 8.

As with the assumption of FIG. 4, the receiver according to another embodiment of the present disclosure may find an optimum transmission/reception beam combination in a preset beam combination selection window using the first RF chain 410, measure CSI on the selected optimum transmission/reception beam using the second RF chain 415 in the following subframe of the beam combination selection window, and report the measured CSI to the transmitter.

Likewise, as with the assumption of FIG. 4, when the receiver according to another embodiment of the present disclosure includes three RF chains, the purposes of the RF chains may be variably allocated and managed based on a conditioned preferred by the receiver. Then, the preferred condition may include whether an optimum reception beam is selected based on the CSI RS received most recently and on how many reception beams an optimum transmission beam and CSI information will be reported.

Figure 5:
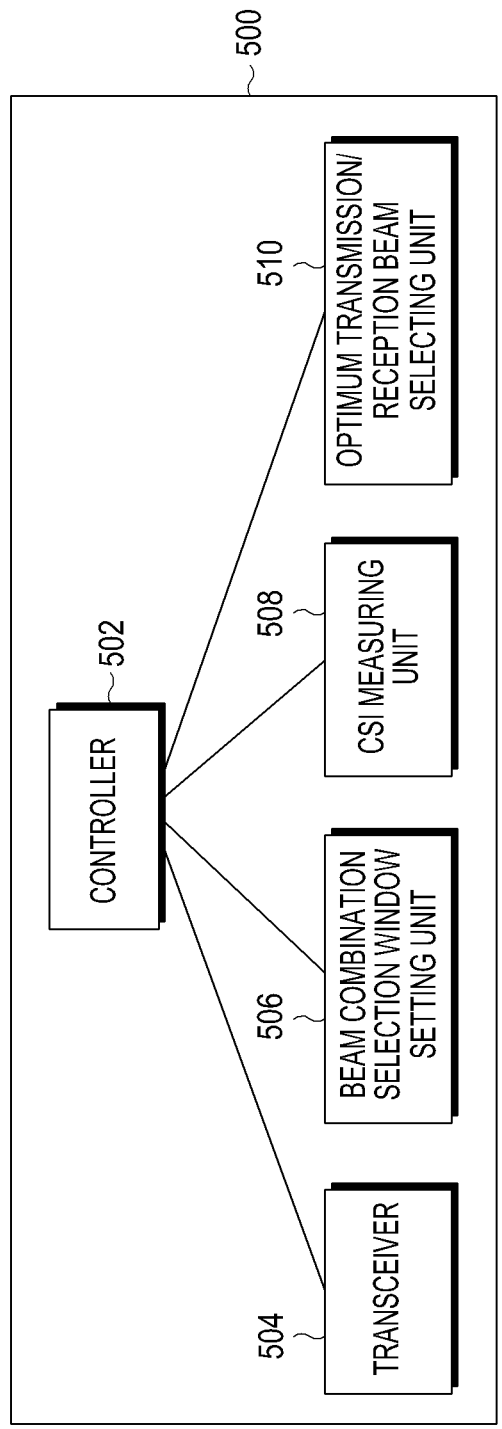
FIG. 5 is a block diagram of a terminal according to an embodiment of the present disclosure.

FIG. 5 is a view showing a schematic diagram of a terminal according to an embodiment of the present disclosure.

Referring to FIG. 5, the receiver 500 includes a controller 502, a transceiver 504, a beam combination selection window setting unit 506, a CSI measuring unit 508, and an optimum transmission/reception beam selecting unit 510. Referring to FIG. 5, the receiver 500 includes partial units for performing an operation according to the embodiment of the present disclosure for convenience' sake. However, although not shown in FIG. 5, the receiver 500 includes a digital beam forming unit, an analog beam forming unit, and a plurality of RF chains to correspond to the transmitter of FIG. 1. Then, the transceiver 504 has substantially the same form as the array antenna of the transmitter 100 and may include array antennas including a plurality of element antennas.

First, the controller 502 controls the transceiver 504 such that the receiver variably set by the transmitter calculates a minimum reportable period according to the number of reportable optimum beams and forwards the calculated period to the transmitter. Alternatively, the controller 502 may control the transceiver 504 such that the transceiver 504 transmits only information on the number of RF chains of the transceiver 504 to the transmitter, and the transmitter may acquire a minimum reportable period calculated based on Equation 1. The process of calculating and acquiring the minimum reportable period may be performed through a capability negotiation process between the transmitter and the receiver.

Next, the controller 502 may variably allocate and manage the purposes of the RF chains of the receiver 500. The beam combination selection window setting unit 506 includes preset subframes according to an instruction of the controller 502. The CSI measuring unit 508 measures a reception intensity of a channel measurement reference signal on all transmission beams of the transmitter for each reception beams through the transceiver 504 and forwards the measured reception intensity to the optimum transmission/reception beam selecting unit 510 in subframes corresponding to the beam combination selection window set according to an instruction of the controller 502 in the embodiment of the present disclosure. Then, the optimum transmission/reception beam selecting unit 510 determines a predetermined optimum reception beam in the highest order of the signal intensity of the received intensities. Then, because a detailed operation of the optimum transmission/reception beam selecting unit 510 corresponds to FIG. 2, a description thereof will be omitted. Then, the controller 502 measures a reception intensity of a channel measurement reference signal for an optimum reception beam using a predetermined RF chain and controls the optimum transmission/reception beam selecting unit 510 such that an optimum transmission beam is determined based on the measured reception intensity. Further, the CSI measuring unit 508 measures CSI based on the optimum transmission/reception beam according to an instruction of the controller 502.

Thereafter, the controller 502 controls such that the optimum transmission/reception beam selected by the receiver and the CSI corresponding to the optimum transmission/reception beam are generated as feedback information and are reported to the transmitter through the transceiver 504.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting channel information by a receiver in a communication system using beam forming, the method comprising:
   receiving reference signals transmitted through transmission beams of a transmitter by a first radio frequency chain using reception beams of the receiver during a first period;
   determining a reception beam among reception beams of the receiver based on receive strengths of the reference signals received by the first radio frequency chain;
   receiving reference signals transmitted through the transmission beams by a second radio frequency chain using the determined reception beam during a second period;
   determining a transmission beam among the transmission beams of a transmitter based on receive strengths of the reference signals received by the second radio frequency chain; and
   measuring a channel state based on a reference signal corresponding to determined transmission beam and the determined reception beam, and transmitting channel information related to the channel state to the transmitter.

2. The method of claim 1, wherein each of the first radio frequency chain and the second radio frequency chain included in the receiver, is configured to map analog beams to a digital signal.

3. The method of claim 2, further comprising:
   transmitting the number of radio frequency chains included in the receiver; and
   receiving, from the transmitter, period information for transmitting the channel information determined based on the number of the radio frequency chains.

4. The method of claim 1, wherein the channel information further includes information on the determined reception beam.

5. The method of claim 1, further comprising:
   receiving reference signals transmitted through the determined transmission beam by the reception beams after reporting information on the determined reception beam; and
   re-determining a reception beam based on receive strengths of the reference signals corresponding to the determined transmission beam.

6. The method of claim 5, wherein, if the re-determined reception beam is different from the determined reception beam, transmitting information on the re-determined reception beam.

7. A method for receiving channel information by a transmitter in a communication system using beam forming, the method comprising:
   transmitting reference signals through transmission beams of a transmitter during a predefined period; and
   receiving, from a receiver, channel information related to a channel state measured based on a reference signal corresponding to a reception beam of the receiver and a transmission beam of the transmitter,
   wherein the reception beam among reception beams of the receiver is determined based on receive strengths of the reference signals received by a first radio frequency chain of the receiver, and
   wherein the transmission beam among the transmission beams of the transmitter is determined based on receive strengths of the reference signals received by a second radio frequency chain of the receiver.

8. The method of claim 7, wherein each of the first radio frequency chain and the second radio frequency chain included in the receiver, is configured to map analog beams to a digital signal.

9. The method of claim 8, further comprising:
receiving the number of radio frequency chains included in the receiver; and
determining period information for transmitting the channel information determined based on the number of the radio frequency chains, transmitting the period information to the receiver.

10. The method of claim 7, wherein the channel information further includes information on the reception beam.

11. The method of claim 7, further comprising:
transmitting reference signals through the transmission beam after receiving information on the reception beam from the receiver; and
if a re-determined reception beam, which is re-determined based on receive strengths of the reference signals corresponding to the transmission beam, is different from the reception beam, receiving information on the re-determined reception beam from the receiver.

12. A device for transmitting channel information in a communication system using beam forming, the device comprising:
a receiver configured to receive reference signals transmitted through transmission beams of a transmitter by a first radio frequency chain using reception beams of the receiver during a first period; and
a controller configured to:
determine a reception beam among reception beams of the receiver based on receive strengths of the reference signals received by the first radio frequency chain,
control the receiver to receive reference signals transmitted through the transmission beams by a second radio frequency chain using the determined reception beam during a second period,
determine a transmission beam among the transmission beams based on receive strengths of the reference signals received by the second radio frequency chain,
measure a channel state based on a reference signal corresponding to the determined transmission beam and the determined reception beam, and
transmit channel information related to the channel state to a transmitter.

13. The device of claim 12, wherein each of the first radio frequency chain and the second radio frequency chain included in the receiver, is configured to map analog beams to a digital signal.

14. The device of claim 13,
wherein the transmitter is configured to transmit the number of radio frequency chains included in the receiver, and
wherein the receiver is further configured to receive, from the transmitter, period information for transmitting the channel information determined based on the number of the radio frequency chains included in the receiver.

15. The device of claim 12, wherein the channel information further includes information on the determined reception beam.

16. The device of claim 12,
wherein the receiver is further configured to receive reference signals transmitted through the determined transmission beam by the reception beams after reporting information on the determined reception beam, and
wherein the controller is further configured to re-determine an reception beam based on receive strengths of the reference signals corresponding to the determined transmission beam.

17. The device of claim 16,
wherein, if the re-determined reception beam is different from the determined reception beam, the transmitter is configured to transmit information on the re-determined reception beam.

18. A device for receiving channel information in a communication system using beam forming, the device comprising:
a transmitter configured to transmit reference signals through transmission beams during a predefined period; and
a receiver configured to receive channel information related to a channel state measured based on a reference signal corresponding to a reception beam of the receiver and a transmission beam of the transmitter,
wherein the reception beam among reception beams of the receiver is determined based on receive strengths of the reference signals received by a first radio frequency chain of the receiver, and
wherein the transmission beam among the transmission beams of the transmitter is determined based on receive strengths of the reference signals received by a second radio frequency chain of the receiver.

19. The device of claim 18, wherein the first radio frequency chain and the second radio frequency chain are configured to map analog beams to a digital signal.

20. The device of claim 19, further comprising:
a controller configured to determine period information for transmitting the channel information determined based on a number of radio frequency chains included in the receiver, and
wherein the transmitter is configured to transmit the period information to the receiver.

21. The device of claim 18, wherein the channel information further includes information on the determined reception beam.

22. The device of claim 18,
wherein the transmitter is further configured to transmit reference signals through the transmission beam after receiving information on the determined reception beam from the receiver,
wherein, if a re-determined reception beam, which is re-determined based on receive strengths of the reference signals, is different from the reception beam, the receiver is further configured to receive information on the re-determined reception beam, and
wherein the re-determined reception beam is re-determined based on strengths of the reference signals corresponding to the determined transmission beam.

* * * * *